United States Patent
Bruning et al.

(10) Patent No.: US 8,146,942 B2
(45) Date of Patent: Apr. 3, 2012

(54) AIRBAG BRACKET

(75) Inventors: Thomas Bruning, Schwieberdingen (DE); Bernt Wallrabe, Simmozheim (DE); Rainer Mertens, Sachsenheim (DE); Andre Kurschner, Kleinsachsenheim (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 129 days.

(21) Appl. No.: 12/758,902

(22) Filed: Apr. 13, 2010

(65) Prior Publication Data

US 2010/0270776 A1 Oct. 28, 2010

(30) Foreign Application Priority Data

Apr. 25, 2009 (DE) .......................... 10 2009 018 950

(51) Int. Cl.
B60R 21/205 (2011.01)
(52) U.S. Cl. ................... 280/728.2; 280/732
(58) Field of Classification Search ............. 280/728.2, 280/732, 730.1, 752; 296/70; 180/90
See application file for complete search history.

(56) References Cited

U.S. PATENT DOCUMENTS

| | | | |
|---|---|---|---|
| 3,930,664 A * | 1/1976 | Parr et al. ....................... | 280/732 |
| 3,966,227 A | 6/1976 | Cameron | |
| 5,190,314 A | 3/1993 | Takasugi | |
| 5,230,530 A * | 7/1993 | Iriyama et al. ................ | 280/732 |
| 5,403,033 A * | 4/1995 | Koma ........................ | 280/728.2 |
| 5,425,549 A | 6/1995 | Oda | |
| 5,489,116 A | 2/1996 | Boag | |
| 5,516,145 A * | 5/1996 | Williams et al. .............. | 280/732 |
| 5,669,626 A * | 9/1997 | Bartos et al. ................ | 280/728.2 |
| 5,820,157 A * | 10/1998 | Matsumoto ................. | 280/728.2 |
| 5,904,367 A | 5/1999 | Warnez et al. | |
| 5,979,929 A * | 11/1999 | Stanger et al. ............. | 280/728.2 |
| 6,536,802 B1 | 3/2003 | Sutherland et al. | |
| 6,854,761 B2 | 2/2005 | Dietrich | |
| 7,290,788 B2 * | 11/2007 | Tomford et al. .......... | 280/728.2 |
| 7,370,879 B2 * | 5/2008 | Hotta et al. ................ | 280/728.2 |
| 7,604,250 B2 * | 10/2009 | Hotta et al. ................ | 280/728.2 |
| 2006/0071459 A1 | 4/2006 | Hayakawa et al. | |

FOREIGN PATENT DOCUMENTS

| | | |
|---|---|---|
| EP | 0 753 433 | 1/1997 |
| FR | 2793207 | 11/2000 |
| JP | 11011248 | 1/1999 |

* cited by examiner

*Primary Examiner* — Drew Brown
(74) *Attorney, Agent, or Firm* — Gerald E. Hespos; Michael J. Porco

(57) ABSTRACT

An airbag bracket has at least one airbag fastening section (31, 32, 41, 42) for fastening an airbag device to the airbag bracket (1) and has at least one instrument panel fastening section (11, 12, 13, 23, 24) for fastening an instrument panel to the airbag bracket. Thus, forces occurring during the triggering of the airbag device can be reliably absorbed. The airbag bracket (1) has at least one supporting fastening section (35, 45) for fastening the airbag bracket (1) to a supporting structure of a motor vehicle.

16 Claims, 1 Drawing Sheet

AIRBAG BRACKET

CROSS-REFERENCE TO RELATED APPLICATIONS

This application claims priority under 35 USC 119 to German Patent Application No. 10 2009 018 950.5 filed on Apr. 25, 2009, the entire disclosure of which is incorporated herein by reference.

BACKGROUND OF THE INVENTION

1. Field of the Invention

The invention relates to an airbag bracket having at least one airbag fastening section for fastening an airbag device to the airbag bracket and having at least one instrument panel fastening section for fastening an instrument panel to the airbag bracket.

2. Description of the Related Art

European patent EP 0 753 433 B1 discloses an airbag installation device having a lower fastening means and having a lateral fastening means that is fastened to a support in the form of a planar steel plate with two ends curved in opposite directions.

It is an object of the invention to create an airbag bracket that can reliably absorb the forces that occur during the triggering of the airbag device. Stringent safety requirements with regard to a head impact also should be met.

SUMMARY OF THE INVENTION

The invention relates to an airbag bracket having at least one airbag fastening section for fastening an airbag device to the airbag bracket and having at least one instrument panel fastening section for fastening an instrument panel to the airbag bracket. The airbag bracket comprises at least one supporting fastening section for fastening the airbag bracket to a supporting structure of a motor vehicle. The fastening sections preferably are connected integrally to one another. The airbag bracket may be formed as a sheet-metal part, in particular as a sheet-metal shaped part. However, the airbag bracket alternatively may be formed as a pressure-die-cast part. Some or all the fastening sections also may be connected fixedly to the airbag bracket in cohesive fashion or in some other way. The airbag bracket according to the invention enables the instrument panel to be connected to the supporting structure of the motor vehicle in the region of the airbag device. In this way, forces released during the triggering of the airbag device are introduced into the supporting structure in a considerably improved manner, particularly in a Z direction of the motor vehicle.

The airbag bracket may be U-shaped and may have a base with two opposite ends and two limbs that are angled away from the opposite ends of the base. The U-shaped airbag bracket delimits a holding space for the airbag device between the limbs. The open side of the airbag bracket preferably is closed off by a supporting structure, such as a cross member.

The base of the airbag bracket may have passage openings and reinforcement structures on the instrument panel may pass through the passage openings. The instrument panel may be formed at least partially from plastic and may be provided with reinforcement ribs. The passage openings receive the reinforcement structures of the instrument panel in the event of a crash, such as a head impact against the instrument panel. The passage openings also may allow access to deformation spaces under the base of the airbag bracket. The reinforcement structure of the instrument panel may deform into said deformation spaces if required.

The base of the airbag bracket may have at least one raised region. The raised region preferably extends over almost the entire length of the base of the airbag bracket and stiffens the airbag bracket.

The base of the airbag bracket may have at least one instrument panel fastening section for fastening the instrument panel to the airbag bracket. Plural instrument panel fastening sections preferably are distributed uniformly over the length of the base.

The limbs of the airbag bracket each may have at least one airbag fastening section for fastening the airbag device to the airbag bracket. Each airbag fastening section preferably comprises a through hole for leading through or for receiving fastening means, such as screws or rivets, to fasten the airbag device to the airbag bracket.

Each limb of the airbag bracket preferably has two airbag fastening sections for fastening the airbag device to the airbag bracket. The airbag fastening sections preferably are provided at the ends of the limbs.

The limbs of the airbag bracket preferably are angled away from the base of the airbag bracket at right angles. In the installed state, the limbs of the airbag bracket preferably are arranged in the vehicle longitudinal direction and the base of the airbag bracket preferably extends in the transverse direction of the vehicle.

At least one supporting fastening section preferably is provided for fastening the airbag bracket to the supporting structure of the motor vehicle and extends from the limbs of the airbag bracket. The supporting fastening section preferably comprises a through hole for receiving fastening means, such as screws or rivets, that fasten the airbag bracket to the supporting structure.

The supporting fastening sections preferably extend out from the limbs of the airbag bracket at right angles.

The supporting fastening sections preferably are arranged on the limbs in each case between two airbag fastening sections. This arrangement has proven to be particularly advantageous with regard to the introduction of force in the event of a crash.

An elongation preferably is angled away from each of the limbs. The elongations preferably are angled away from the limbs at an obtuse angle.

The elongations each may have at least one instrument panel fastening section for fastening the instrument panel to the airbag bracket. Each fastening section preferably comprises a through hole for leading through or for receiving fastening means, such as screws or rivets, for fastening the instrument panel to the airbag bracket.

The invention also relates to a motor vehicle with a supporting structure to which the above-described airbag bracket is fastened by a supporting fastening section. The airbag bracket of the invention is fastened preferably two of the supporting fastening sections to a cross member of the supporting structure of the motor vehicle. The airbag bracket preferably is arranged on the co-driver's side, above a glove compartment.

Further advantages, features and details of the invention will emerge from the following description in which an exemplary embodiment is described in detail with reference to the drawing.

DETAILED DESCRIPTION OF THE PREFERRED EMBODIMENT

Figure 1:
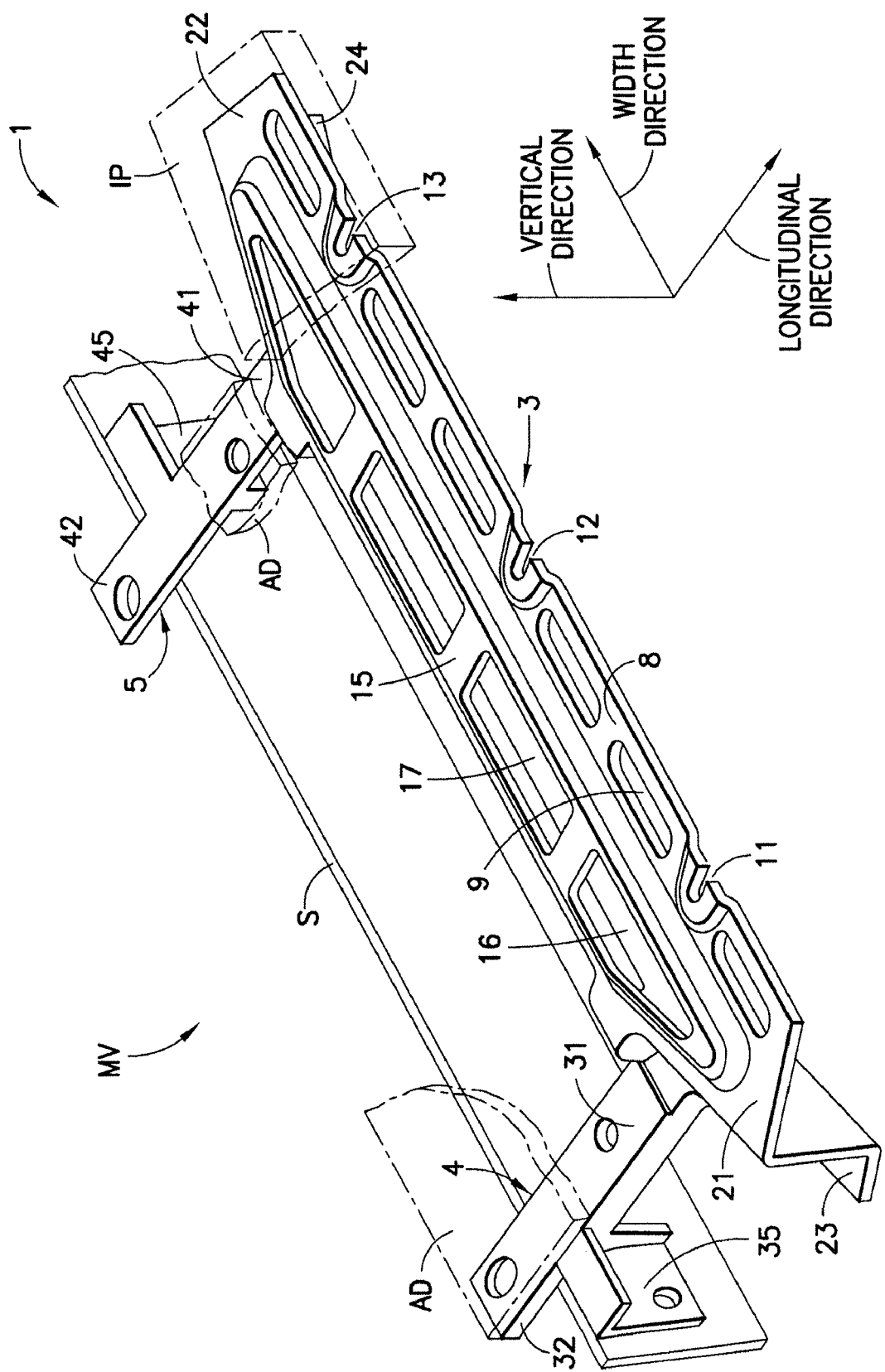
FIG. 1 is a perspective illustration of an airbag bracket according to the invention.

An airbag bracket in accordance with the invention is identified by the numeral 1 in FIG. 1 is a perspective illustration of an airbag bracket 1. The airbag bracket 1 is U-shaped and comprises an elongate base 3, and two limbs 4, 5 that are angled away from opposite ends of the base 3. The two limbs 4, 5 are arranged at right angles to the base 3 and are parallel to one another. In the installed state, the base 3 extends in the transverse or width direction of a motor vehicle MV.

The base 3 comprises a body 8 with a plurality of passage openings 9 and three instrument panel fastening sections 11, 12, 13. The passage openings 9 and the instrument panel fastening sections 11, 12, 13 are provided on a side of the base 3 of the airbag bracket 1 that faces away from the limbs 4, 5. The body 8 also has a raised region 15 with further passage openings 16, 17. The raised region 15 reinforces the body 8.

Reinforcement structures on the instrument panel can pass through the passage openings 9 and the further passage openings 16, 17. In the event of an accident, in particular a head impact against the instrument panel IP, the reinforcement structure elements can deform into and through the passage openings 9, 10 and 16, 17.

Elongations 21, 22 are provided at ends of the base 3 and extend beyond the attachment regions at which the limbs 4, 5 are connected integrally to the base 3. The elongations 21, 22 are at an obtuse angle to the limbs 4, 5 and each elongation 21, 22 has a further instrument panel fastening section 23, 24. The instrument panel IP is fastened to a total of five instrument panel fastening sections 11, 12, 13 and 23, 24 of the airbag bracket 1.

The limb 4 has a first airbag fastening section 31 in proximity to the body 8 and a second airbag fastening section 32 at the free end of the limb 4. A supporting fastening section 35 is angled outward away from the limb 4 between the two airbag fastening sections 31, 32. Similarly, the limb 5 has airbag fastening sections 41, 42. A further supporting fastening section 45 is angled laterally out away from the limb 5 between the two airbag fastening sections 41 and 42.

The two supporting fastening sections 35 and 45 serve to fasten the airbag bracket 1 to the supporting structure S of the motor vehicle, in particular to a cross member. The cross member may have a recess or projection in the region of the airbag device.

The forces that are released during the triggering of the airbag device AD are introduced, preferably in the vertical or Z direction, into the supporting structure S via the airbag bracket 1. Triggering generates a Z force component down and, as a result of a so-called catching shock in the maximum inflated position of the airbag, also generates a Z force component up. These forces can be absorbed entirely by the airbag bracket 1. The inflated airbag air sack additionally conducts a massive Z supporting force downwards onto the entire instrument panel. The Z supporting force can likewise be absorbed by the airbag bracket 1.

The instrument panel fastening sections 11 to 13 also enable a glove compartment to be attached to the airbag bracket 1.

What is claimed is:

1. An airbag bracket comprising a base, two limbs angled away from opposite ends of the base so that the base and the limbs define a U-shape, two airbag fastening sections on each of the limbs for fastening an airbag device to the airbag bracket, at least one instrument panel fastening section on the base for fastening an instrument panel to the airbag bracket, and at least one supporting fastening section extending out from each of the limbs at positions between the airbag fastening sections of the respective limb for fastening the airbag bracket to a supporting structure of a motor vehicle.

2. The airbag bracket of claim 1, wherein the air two limbs are angled substantially perpendicularly away from opposite ends of the base.

3. The airbag bracket of claim 1, wherein the base of the airbag bracket has passage openings for receiving reinforcement structures of the instrument panel.

4. The airbag bracket of claim 1, wherein the base of the airbag bracket has at least one raised region.

5. The airbag bracket of claim 1, wherein the at least one instrument panel fastening section of the base comprises a plurality of spaced apart instrument panel fastening sections for fastening the instrument panel to the airbag bracket.

6. The airbag bracket of claim 1, wherein the airbag fastening sections on each of the limbs are spaced apart in directions substantially perpendicular to an extending direction of the base.

7. The airbag bracket of claim 1, wherein each of the airbag fastening sections comprises a through hole for receiving a fastening means for fastening the airbag device to the airbag bracket.

8. The airbag bracket of claim 1, wherein the limbs of the airbag bracket each are angled away from the base of the airbag bracket at right angles.

9. The airbag bracket of claim 1, wherein the supporting fastening sections for fastening the airbag bracket to the supporting structure of the motor vehicle extend substantially at right angles from the limbs of the airbag bracket.

10. The airbag bracket of claim 1, further comprising elongations angled away from the limbs at opposite ends of the base.

11. The airbag bracket of claim 10, wherein each of the elongations has at least one instrument panel fastening section for fastening the instrument panel to the airbag bracket.

12. A motor vehicle having a supporting structure to which an airbag bracket according to claim 1 is fastened by the supporting fastening section.

13. An airbag bracket comprising:
an elongate base having opposite first and second ends and a plurality of instrument panel fastening sections formed between the ends of the base for fastening an instrument panel to the airbag bracket;
first and second spaced apart limbs projecting angularly from the base at locations in proximity to the respective first and second ends of the base, each limb being formed with two airbag fastening sections spaced apart in a projecting direction of the limbs for fastening an airbag device to the airbag bracket; and
first and second supporting fastening sections projecting angularly from the respective first and second limbs at positions between the limbs for fastening the airbag bracket to a supporting structure of a motor vehicle.

14. The airbag bracket of claim 13, wherein the base of the airbag bracket has passage openings for receiving reinforcement structures of the instrument panel.

15. The airbag bracket of claim 13, wherein the base of the airbag bracket has at least one raised reinforcement region.

16. An automotive vehicle having a longitudinal travel direction, a width direction transverse to the longitudinal travel direction and a vertical direction transverse to the longitudinal and width directions, the automotive vehicle comprising:
a supporting structure extending in the width direction;
an instrument panel extending in the width direction at a position rearward of the supporting structure;

an airbag device at least partly disposed rearward of the supporting structure and substantially adjacent the instrument panel; and an airbag bracket having an elongate base extending in the width direction and including opposite left and right ends and a plurality of instrument panel fastening sections formed between the ends of the base and fastened to the instrument panel, left and right spaced apart limbs projecting substantially in the longitudinal direction from the base at locations in proximity to the respective left and right ends of the base, each limb being formed with at least one airbag fastening section fastened to the airbag device, and left and right supporting fastening sections projecting perpendicularly down from the respective left and right limbs and fastened to the supporting structure of a motor vehicle.

* * * * *